Figure 1:
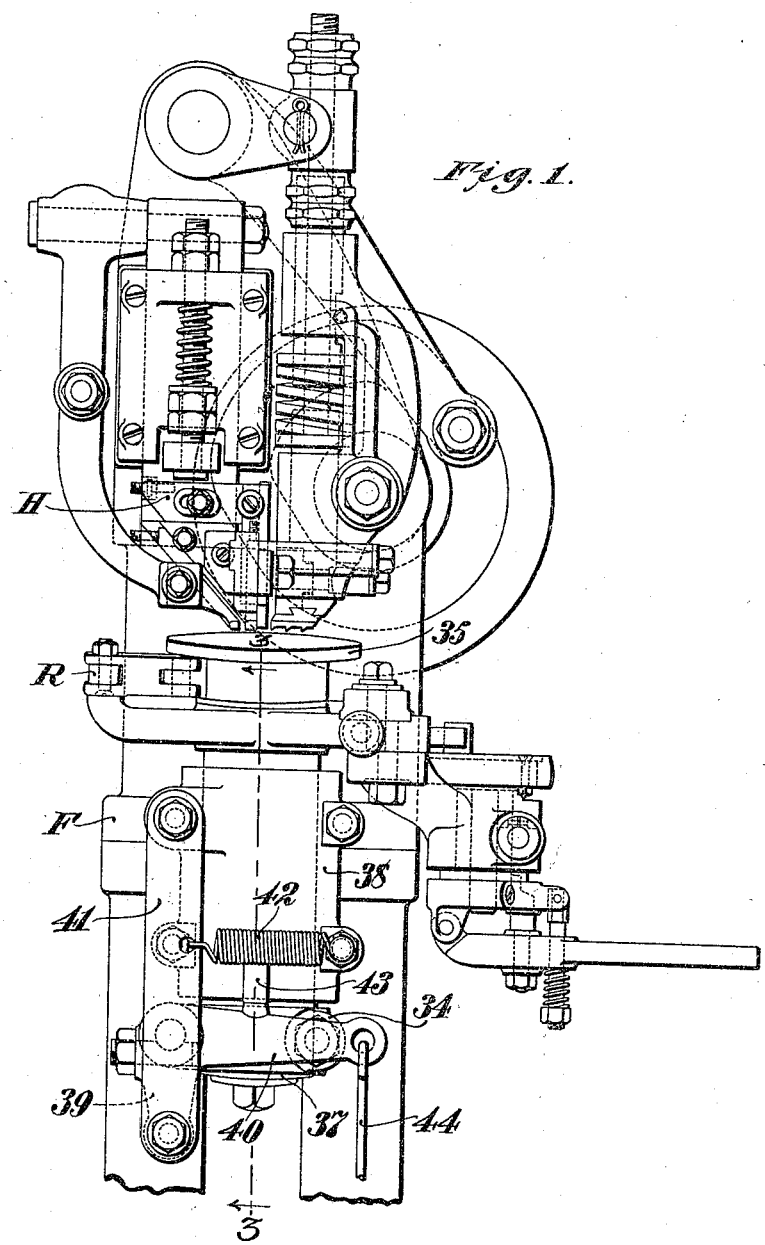

W. C. MEYER.
WORK SUPPORT.
APPLICATION FILED SEPT. 22, 1909.

984,772.

Patented Feb. 21, 1911.
2 SHEETS—SHEET 2.

Witnesses:
E. C. Wurdeman
Warren G. Ogden

Inventor:
William C. Meyer
by his attorneys
Phillips, Van Everen & Fish

UNITED STATES PATENT OFFICE.

WILLIAM C. MEYER, OF BOSTON, MASSACHUSETTS, ASSIGNOR TO UNITED SHOE MACHINERY COMPANY, OF PATERSON, NEW JERSEY, A CORPORATION OF NEW JERSEY.

WORK-SUPPORT.

984,772.      Specification of Letters Patent.      Patented Feb. 21, 1911.

Original application filed November 7, 1906, Serial No. 342,328. Divided and this application filed September 22, 1909. Serial No. 519,022.

*To all whom it may concern:*

Be it known that I, WILLIAM C. MEYER, a citizen of the United States, residing at Boston, in the county of Suffolk and State of Massachusetts, have invented certain Improvements in Work-Supports, of which the following description, in connection with the accompanying drawings, is a specification, like reference characters on the drawings indicating like parts in the several figures.

This invention relates to work supports for shoe machines, and more particularly to means for separating a work support from the operating tool to permit insertion and removal of the work.

The invention is shown as applied to the sole channeling machine of my co-pending application, Ser. No. 342,328, filed November 7, 1906, from which the present application has been divided, but the invention is not limited in its use to the type of machine illustrated.

Owing to the nature of the operations performed by many shoe machines it is desirable, if not essential, in these machines that the work be supported in working relation to the tool by the machine, instead of by the operator as in many other shoe machines. The shape of the shoe, or of the particular part being operated on, renders the work inconvenient for ready insertion in, or removal from, working position without a separation of the support and tool. Ordinarily the work support is moved away from the tool as generally this portion of the machine is so designed that it can readily be mounted for movement, which is not true, ordinarily, of the tool.

The principal object of the preesnt invention is to provide, in a shoe machine employing a work support, an improved mechanism for moving the work support away from the tool to permit the operator to remove completed work and insert new work in working position relative to the operating tool.

Another object of the invention is to provide improved operating devices for moving a work support, in the manner described, which will hold the support unyieldingly in working position during the operation of the machine, or until removed from working position.

In accordance with these objects, the present invention contemplates the provision of a work support mounted to slide in a suitable stationary guideway toward and from the operating tool, and operating devices, comprising toggle means and controlling devices therefor, normally holding the support in working position, but constructed and arranged to permit a removal from working position either during the operation of the tool on the work or after the completion of its operation. Preferably the movement of the support to separate it from the tool is under control of the operator while the return movement is accomplished automatically. The invention, however, as defined by the claims is not limited to this form of control but is of sufficient breadth to include an automatic control of the movement in both directions.

To the accomplishment of the objects of the invention above referred to, the invention comprises the features and combinations of parts hereinafter described and particularly pointed out in the appended claims.

The preferred form of the invention is illustrated in the accompanying drawings, in which—

Figure 2:
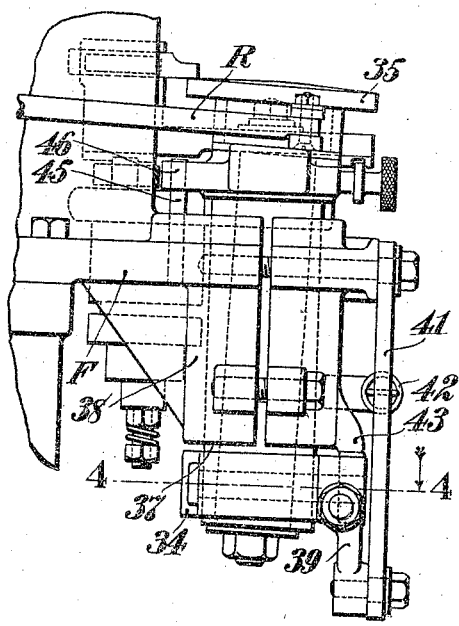
Figure 3:
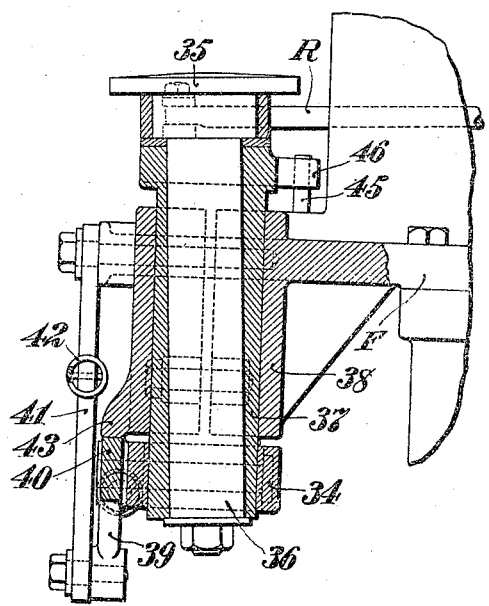
Figure 4:
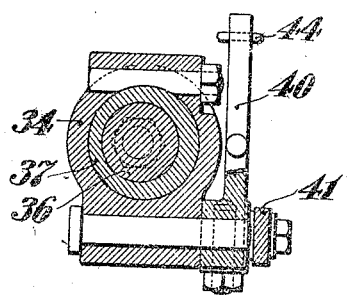

Figure 1 is a front elevation of the work support and its operating devices shown as applied to the sole channeling machine of my co-pending application hereinbefore referred to; Fig. 2 is a side elevation; Fig. 3 is a section in elevation on line 3—3 of Fig. 1 looking in the direction of the arrows; and Fig. 4 is a section, in plan, on the line 4—4 of Fig. 2.

In the illustrated embodiment of the invention the head H (Fig. 1) of the channeling machine, with its attachments and the operating mechanism therefor, is the same as is illustrated and described in my co-pending application hereinbefore referred to. These parts are merely illustrative of one type of machine to which the present invention may be applied and, therefore, need not be described herein.

Referring now more particularly to Fig. 3, for the purpose of a sole channeling machine, the portion of the support which engages the work consists of a slightly convex circular table 35 mounted upon a stem 36 carried in a vertical slide 37. As illustrated, the table is mounted for rotation by means of actuating devices operated through the connecting rod R all as illustrated and described in my co-pending application hereinbefore referred to. For the purpose of operating upon a sole the stem of the table 35 is slightly inclined outwardly. The slide 37 is mounted for movement toward and from the operating tool in a guideway formed by a clamp bracket 38 (Fig. 2) extending from the machine frame F. At its lower end the slide 37 is provided with a removable collar 34 (Fig. 4) on which is pivoted a bell-crank lever (Fig. 1) having a depending arm 39 and a normally, substantially horizontal arm 40. The depending arm of the bell-crank lever has pivoted thereto the lower end of a link 41 the upper end of which is pivoted to the bracket 38 at a point vertically above the pivot of the bell-crank lever. A spring 42 connected at one end to the link 41 and at its other end to a pin on the bracket 38 tends to maintain the link 41 in its vertical position, and the lower end of the bell-crank arm 39 is held in alinement with the pivots of the bell-crank and link by the engagement of a suitably proportioned boss (Fig. 1), on the upper side of the arm 40, with a stop 43 on the bracket 38. When the parts are in this position the work table is raised to working position and is held unyieldingly in such position owing to the fact that the parts 39 and 41 form a toggle which at this time is straightened and so located as to prevent vertical movement of the stem 37. The toggle may be broken and the work support lowered by an angular movement of the link or bell-crank. In the illustrated embodiment of the invention this is effected by depressing a treadle (not shown) connected to a treadle rod 44 (Fig. 1) attached to the bell-crank lever arm 40. A very light pressure applied to the outer end of the arm 40 will move the bell-crank bodily about its connection to the lower end of the link 41 as a pivot, the link at this time swinging to the left in Fig. 1 about its upper end as a pivot thus breaking the toggle. A separation of the work support and operating tool is thus easily effected permitting ready insertion of the work in, or its removal from, operating position. Such a control of the work support moving mechanism permits its separation from the operating tool during the operation of the machine, if this becomes necessary, as well as after the completion of the operation on the particular work in the machine. After new work has been placed on the table 35, the treadle, or other controlling device, is released and the spring 42 automatically restores the toggle to its straightened position and at the same time raises the work support and work into operative position relative to the tool. Rotation of the slide 37, as it is moved vertically in the bracket 38, is prevented by means of a vertical pin 45 (Figs. 2 and 3), in the machine frame F, passing loosely through a hole in a lug 46 extending from the slide at its rear side.

While the particulars described are well suited to one mechanical form of the invention, it is not to be understood that these particulars are essential since they may be variously modified within the skill of the artisan without departing from the true scope of the actual invention as defined by the claims.

What is claimed as new, is:—

1. The combination with a work support vertically movable in the stationary frame, of means for raising and lowering the work support comprising a toggle, of which one arm is inverted, connecting the support with the stationary frame, means to break the toggle to lower the work support, and means to straighten the toggle to raise the work support, substantially as described.

2. The combination with a stationary frame and a work support vertically movable relatively thereto, of a lever arm pivoted to one of said parts, a second lever arm pivoted to the other of said parts extending in the direction of and beyond the pivot of the first lever arm, a pivotal connection between the free ends of said lever arms, means for maintaining the two pivots and pivotal connection in alinement when the work support is raised, and means operating on one of said lever arms to break the alinement and lower the work support, substantially as described.

3. The combination with a work support and a bracket in which said support is vertically movable, of a bell-crank lever pivoted on the support, a link connecting one arm of the bell-crank lever to the bracket, means for moving the other arm of the bell-crank lever to lower the work support, and a device opposing said means acting to raise the work support, substantially as described.

4. The combination with a work support mounted to slide in a vertical guideway, of a bell-crank lever pivoted on the slide having a horizontal arm and a depending arm, a vertically arranged link connected at its lower end to the depending arm, and at its upper end to the guideway, and means for holding the depending arm and link in alinement to maintain the work support in raised position, substantially as described.

5. The combination with a vertically movable work support, of means for lowering and raising the work support comprising a toggle of which one arm is inverted and forms part of a bell-crank lever pivotally connected with the work support, the other arm of the lever being manually operable to actuate the work support, substantially as described.

6. The combination with a work support mounted on a vertical slide, of a bell-crank lever pivoted to the slide and having a horizontal arm and a depending arm, a vertical link pivoted at its lower end to the depending arm and at its upper end to a fixed part of the machine, and a spring connected with the link and operating to hold the link normally substantially in line with the depending arm of the lever, substantially as described.

In testimony whereof I have signed my name to this specification in the presence of two subscribing witnesses.

WILLIAM C. MEYER.

Witnesses:
 WARREN G. OGDEN,
 RUTH A. SIMONDS.